United States Patent [19]

Burkholder

[11] 4,338,719
[45] Jul. 13, 1982

[54] FILAMENT TYPE VEGETATION TRIMMER

[75] Inventor: Robert F. Burkholder, Easton, Md.

[73] Assignee: Black & Decker Inc., Newark, Del.

[21] Appl. No.: 176,288

[22] Filed: Aug. 8, 1980

[51] Int. Cl.³ .......................................... A01D 50/00
[52] U.S. Cl. ...................................... 30/276; 56/12.7
[58] Field of Search ................. 30/276, 347; 56/12.7, 56/17.1, 17.2

[56] References Cited

U.S. PATENT DOCUMENTS

| 4,077,191 | 3/1978 | Pittinger | 56/12.7 |
| 4,156,967 | 6/1979 | Ballas | 30/276 |
| 4,211,004 | 7/1980 | Woods | 30/276 |
| 4,271,594 | 6/1981 | Kilmer | 30/276 |
| 4,271,595 | 6/1981 | Rahe | 30/347 |
| 4,285,128 | 8/1981 | Schnell | 30/276 |

Primary Examiner—Jimmy C. Peters
Attorney, Agent, or Firm—Edward D. Murphy; Walter Ottesen; Harold Weinstein

[57] ABSTRACT

A filament type vegetation trimmer having slinger head for rotating a portion of the filament in a radial plane is provided with a filament support tube for supporting the filament in the radial plane, the filament support tube being provided with apparatus which coact with apparatus provided in the slinger head for cooling the filament supported therewithin.

29 Claims, 6 Drawing Figures

U.S. Patent  Jul. 13, 1982  Sheet 1 of 2  4,338,719
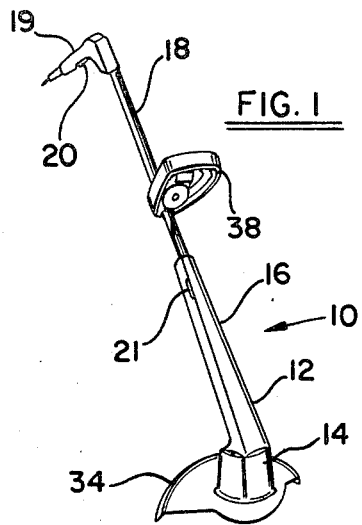
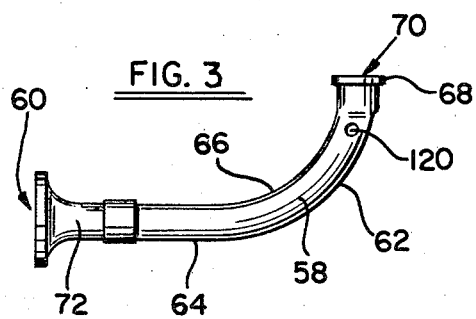
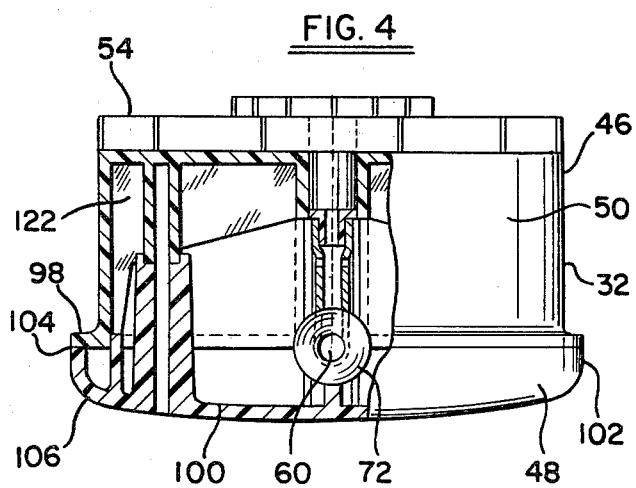
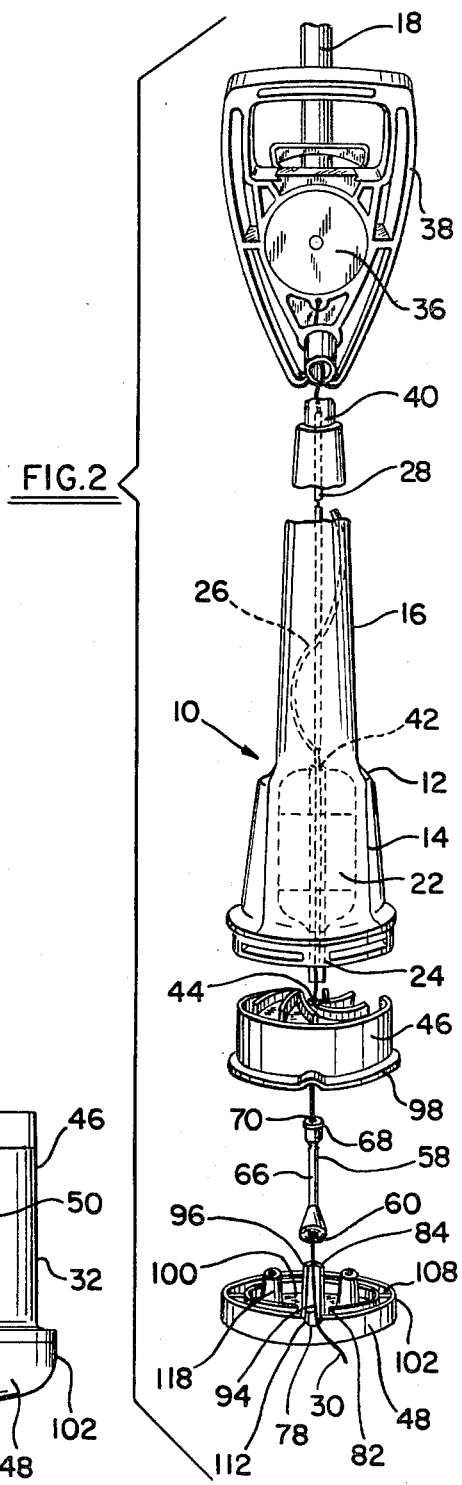

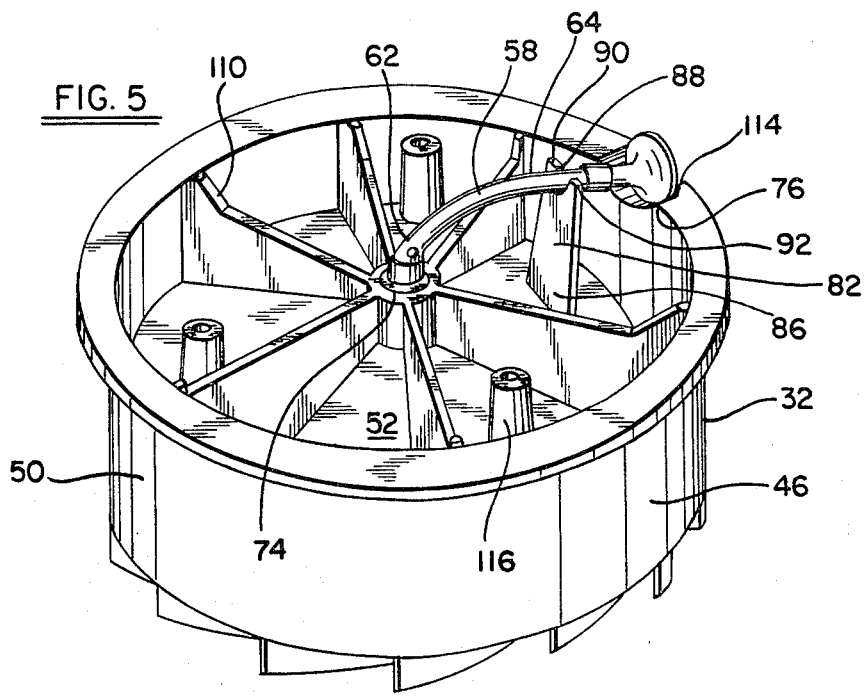
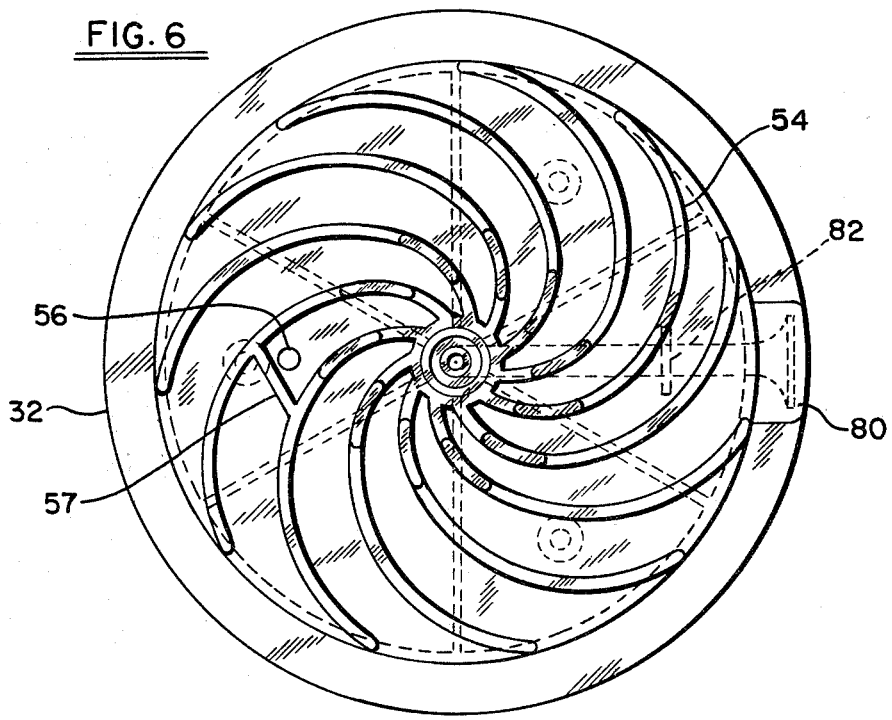

FILAMENT TYPE VEGETATION TRIMMER

BACKGROUND OF THE INVENTION

1. Field of the Invention

The present invention relates to filament type devices for trimming vegetation.

More particularly, the present invention relates to filament type trimming devices wherein a cutting filament is fed out from a spool and is supported in a plane radial to the shaft axis for rotary cutting movement therein.

2. Description of the Prior Art

Filament type vegetation trimmers in which a filament is rapidly slung radially about an axis to provide a cutting element are well known in the art as a particularly effective alternative to bladed trimmers.

The filament used generally comprises a plastic material and is necessarily more fragile than blades and susceptible to wear and breakage. Accordingly, filament trimmers known in the art generally utilize individual, replaceable filaments or carry a continuous supply of filament which may be fed out gradually and/or incrementally as the exposed cutting filament is worn away. Filament trimmers of the latter type may carry their filament supply on the rotating slinger head or the supply may be carried on a fixed member such as the handle, and fed out to the slinger head for rotation therewith.

Obviously, a fixed filament supply is advantageous in that power is not wasted in effecting unproductive rotation thereof. However, guiding a portion of a filament extending through a longitudinal feed passage into a generally horizontal orientation for cutting in a radial plane has presented significant problems.

For example, U.S. Pat. No. 3,928,911 teaches an open, bell mouthed slinger head in direct, open communication with an axial bore in the power output shaft which is provided with one or more radial grooves for engaging and swinging the filament about the shaft axis. However, initial engagement of the filament with the groove and maintenance of such engagement and swinging support during use have been found to be impracticable.

This problem can be obviated by providing a device wherein a filament is fed out through a bore in the power output shaft with a duct through the slinger head, which duct projects and, thereby, supportively guides filament in a direction generally radial from the output shaft. While this teaching would overcome many of the difficulties of the prior art, filament supported in such a duct would be particularly susceptible to wear and breakage as a result of heat generated by friction and centrifugal force exerted on the filament during use.

In such trimming devices wherein the filament is guided through a longitudinal feed passage and into a plane radial to the axis of the feed passage, the filament must extend through a bend radius interposed between its axially and radially extending portions. During operation, each time the filament is slung radially about the shaft axis, that is once each revolution, the filament twists about its axis. Accordingly, to prevent the filament from twisting up, once each revolution, the filament must rotate about its own axis to untwist and thereby to return to its original, axial condition. This untwisting is effected due to the resiliency inherent in the filament composition and is necessary each revolution as in its absence the filament line would twist tightly around itself. However, the twisting and untwisting together with the centrifugal force exerted on the cutting filament generates heat, particularly at the bend, the amount of heat being directly proportional to the acuteness of the bend radius and other factors such as speed of rotation and filament diameter.

When so heated, the plastic filament material is softened and is then unable to rotate about its axis to untwist in response to the radial movement. The continued rotation then causes the filament to twist up and, along with the softened condition of the plastic, to break. Thus, filament is wasted and the trimmer rendered less economical to operate. Moreover, as the heating, twisting and breaking of the filament occurs within a few minutes of operation, the convenience and desirability of this variety of trimmer are substantially diminished. Although lengthening the bend radius to render same less acute reduces the frictional heat generated therein and so, improves filament life, such lengthening necessarily increases the required length of the guide duct. Increase in the length of the guide duct necessitates increase in the size and resulting weight of the slinger head, with proportionate reduction in economy and ease of manufacture and use.

Electric powered trimmers in which filament is fed out through a bore in the armature shaft present particular difficulties in controlling filament softening. Most known trimmers comprise a closed filament storage and feed system and provide no airflow therethrough. Although it would be possible to achieve some degree of airflow by opening the filament storage and feed system to permit air to flow therethrough, to achieve sufficient airflow for effective filament cooling at its bend in the bend radius portion of the tube, it would be necessary to provide a significantly enlarged armature shaft bore. This requirement necessitates uses of a substantially larger and therefore heavier motor and imposes corresponding difficulties in manufacture and use.

The present invention obviates the problems of the prior art by providing means for cooling the filament during operation without corresponding difficulties or inconveniences in manufacture and use, and provides for a substantially increased filament life, thereby enhancing significantly the usefulness, convenience and desirability of this variety of filament type trimmer.

SUMMARY OF THE INVENTION

The present invention, is intended for use with a filament type vegetation trimmer comprising a prime mover having a rotary power output means, a handle, and a slinger head from which a length of filament is slung rapidly, to provide a cutting element for trimming grass, weeds, thickets and the like. A filament supply is stored conveniently above the slinger head and is fed out through a longitudinal feed passage for rotation by the slinger head in a radial plane.

According to a preferred embodiment of the present invention, a novel conduit tube is provided in the slinger head, in open communication with a bore in the power output shaft bore, for receiving the filament and guiding it through a bend radius for rotation in a plane radial to the power output shaft. The conduit tube hereof mounts in the slinger head for rotation therewith and is provided with means by which filament extending therethrough is cooled during use to prevent premature softening and breakage thereof. The cooling of the filament is achieved by channeling a continuous flow of air from the atmosphere through the conduit tube to cool the filament therein.

Because the filament is cooled continuously during operation, filament disposed in the conduit tube hereof may be guided through a sharper bend radius than has previously been practicable, thereby to permit the use of smaller, lighter, and more easily manufactured slinger heads.

It is therefore an object of the present invention to provide an improved filament trimmer which overcomes the difficulties of the prior art and provides for increased useful life of the cutting filament.

It is a further object of the present invention to provide a filament trimmer having an improved guide duct with means for cooling the filament during use and extending the service life thereof.

It is still a further object of the present invention to provide an improved filament type trimmer having a slinger head which is of lighter weight, more convenient size and more economical manufacture that has hitherto been possible.

Other objects and advantages of the present invention will be readily recognized when the following specification is read with the accompanying drawings wherein:

BRIEF DESCRIPTION OF THE DRAWINGS

FIG. 1 is a front perspective view of the filament type trimmer embodying the present invention;

FIG. 2 is an exploded, elevational view of the present invention, partially broken away with a portion of the handle and the guard omitted for convenience;

FIG. 3 is a side elevational view of the conduit tube;

FIG. 4 is an elevational view of the slinger head, partly in section;

FIG. 5 is a bottom perspective view of the top portion of a slinger head; and

FIG. 6 is a top perspective view of the slinger head hereof.

DETAILED DESCRIPTION OF THE PREFERRED EMBODIMENT

Now and with reference to FIG. 1 there is depicted generally at 10 a filament type vegetation trimmer. The trimmer 10 shown generally comprises a housing element 12 having a housing portion 14 and a housing extension 16. The housing extension 16 is adapted to mount a wand 18 and handle 19 by which means the trimmer may be held during operation. The handle 19 is conveniently provided with an On/Off trigger switch 20 by which means the trimmer 10 may be operated. The housing extension and motor housing are formed integrally and are generally hollow. The housing extension and motor housing may comprise a "clam shell" construction, having two interlocking longitudinal halves, adpated to lock together securely and may be further secured by one or more screws. The housing element 12 is provided with air inlet means comprising vents 21 by which means air is supplied to the interior of the trimmer 10 for reasons which will be explained in detail hereinbelow. Numerous alternative varieties of motor housings, extensions and frames may be adapted for use herein and the particular configuration of the housing and handle employed is not considered critical hereto.

The filament type trimmer hereof may be powered by any conventional prime mover means for providing a rotary power output, such as by batteries, a gasoline engine or an electric motor. The housing 14 of the preferred embodiment shown is an open bottomed structure and receives a conventional electric motor 22 which includes a rotary power output shaft 24. A power cord 26 which is provided on a second end thereof, proximate the handle, has a power input connection for receiving matingly the connection plug of an electric power cord (not shown) for electrical connection with the motor 22. The housing extension 16 further contains a hollow member or conduit 28 for conducting a length of cutting filament 30 from a supply through the housing extension to the motor.

A slinger head 32 is drivingly coupled with the power output shaft 24 at the base of the motor housing 14. The slinger head is adapted to receive a length of filament for rotation therewith. A free end of the filament 30 extends out from the perimeter of the slinger head 32 so that when the filament is rotated with the slinger head 32, the free end of the filament will be whipped around very rapidly and will define a cutting element for engaging and cutting through vegetation.

As shown in FIG. 1, a shield 34 is provided and supported above the slinger head by any convenient means. The shield serves to protect against stones or other debris being thrown back toward the operator.

Further, the shield 34 is provided with a thin metal element (not shown) deployed at a predetermined position proximate the end thereof to cut off the filament 30 at that point to control the length of filament used.

More particularly, the cutting filament 30 comprises a stationary supply of continuous filament line which is stored in a spool 36 which may be supported on the housing 12 or wand 18 or at any convenient point remote from the slinger head 32. In the preferred embodiment, an auxiliary handle 38 is mounted on the wand 18 to facilitate guidance of the trimmer during use. The spool 36 of cutting filament may be conveniently mounted on this auxiliary handle for convenient access thereto.

In the embodiment shown the cutting end of the filament is guided generally longitudinally through the housing extension 16 and the output shaft 24 of the motor 22 and radially out from the slinger head 32. More particularly, the filament 30 extends through a bore provided in the rotary power output shaft 24 and is guided through the slinger head 32 for radial slinging thereby. However, it is to be appreciated that the present filament support and cooling means may be incorporated in principle into filament type trimmers having diverse configurations and mechanisms.

The filament conduit 28 extends through the housing extension 16 and terminates at its upper end in an exposed portion 40 to facilitate threading. At the end opposite the exposed portion 40, the conduit 28 is in open communication with a bore 42 which extends through the power output shaft 24 such that the filament 30 may be guided from its spool through the housing extension 16 and the motor 22 to the slinger head 32. The slinger head 32 may be formed from any suitably durable, lightweight material such as plastic and is drivingly mounted to the power output shaft 24 through a central bore 44 provided therein. In its preferred embodiment, the slinger head 32 comprises an upper, substantially cylindrical member 46 and a lower base 48. The upper portion 46 comprises a cylindrical side wall 50 and an end wall 52 which opposes the motor 22 and so provides a closure for the open bottomed motor housing 14. The surface of the end wall 52 which opposes the motor 20 is provided with a fan structure 54 which extends up into the motor housing and which may conveniently comprise concentric, upstanding, arcuate elements, formed integrally with the cylindrical member 46, substantially perpendicular to the end wall 52 thereof. When the slinger head 32 is rotated rapidly by the power output shaft 24, the rotating fan 54 circulates air provided to the interior of the housing 12 through air vents 21 and so provides air flow to the motor 22 to cool same during operation. The end wall 52 of the member 46 is further provided with an aperture 56 and an upstanding wall 57, axially removed from the central bore 44, by which means the fan 54 additionally serves to supply air to the interior of the slinger head 32 for reasons which will be explained in detail hereinbelow.

As best seen in FIG. 4, the interior of slinger head 32 is provided with means for releasably mounting a unique filament support tube whose particular construction and purpose will be explained in detail hereinbelow. The tube 58 hereof is generally a hollow member having a central channel 60 and a curved, generally L-shaped configuration, defined by a substantially longitudinal portion 62 and a substantially radial portion 64. The tube 58 may be constructed from any suitable, durable, light-weight material. Excellent results are achieved using a brass tube which has been nickel plated to provide a durable and hard wear surface. In this manner the interior of the tube will remain smooth and round for uniform filament wear and improved filament life.

The tube 58 is adapted to extend from the central bore 44 of slinger head 32 through a bend radius 66 to the outer side wall thereof. The interior of the tube 58 should have a cross-sectional area substantially larger than the cross-section of the filament to ensure free axial movement of the filament 30 therein and proper ventilation of the filament 30 as described hereinbelow. Excellent results are achieved where the cross-sectional area of the tube 58 is approximately four times that of the filament 30. At a first end thereof, at the top of its vertical portion 62, the tube 58 is provided with an end piece 68 which is formed from a non-conductive material to define means for "double insulating" the motor 22 from exposed metal elements. The end piece 68 is provided with a central aperture 70 which is in open communication with the central channel 60 of the hollow tube 58. An enlarged mouthpiece 72 is provided at the end of the horizontal portion of the tube. The mouthpiece 72 may be integrally formed or may comprise a discrete element, in interference fit over an enlarged terminal end of the horizontal portion 64 of the tube.

The means for mounting the filament tube 58 comprises a seat 74, concentric with the central bore 44 of the slinger head 32 for receiving the tube end piece 68 snugly thereagainst, such that the end piece aperture 70 and the hollow tube 58 are in open communication with the slinger head bore 44 and the bore 42 in the power output shaft 24.

As best seen in FIGS. 2,4 and 5, the mounting means further comprises support members for retaining the tube 54 rigidly in position and complementary cut out portions 76 and 78 provided on the upper portion 46 and in the base member 48, respectively, which cooperate to define an aperture 80 through which the tube 58 communicates with the atmosphere.

The support members of the mounting means hereof comprise a radial support indicated generally at 82 associated with the upper portion 46 and base 48 of the slinger head and a longitudinal support 84 associated with the base 48. A first portion of the radial support 82 is a rigid member 86 associated with said upper portion 46, substantially perpendicular to the end wall 52 and slightly longer than cylindrical wall 50. The support member 86 is provided with a U-shaped cut out 88 at an upper end thereof, said cut out having a width slightly smaller than the diameter of the tube 58. It is intended that the support member 86 be positioned within the slinger head 32 in alignment with the cut out portion 76 of the wall 50. The support member 86 is preferably formed from a substantially rigid material having a sufficient degree of resilience to permit the portions 90, 92 of the support member 86 proximate the cut out 88 to yield to permit the tube 58 to be resiliently fitted therein. A second portion of said radial support comprises an upstanding support 94, associated with the base in alignment with the U-shaped cut out 88 to abut against the tube 58 urging it into engagement with said cut out portion 88 of support member 86.

The longitudinal support 84, associated with the base 48 is a central, upstanding, open member in alignment with the central bore 44 of the upper portion 46 of the slinger head 32. The open channel 96 defined by the open support member 84 has a width that is greater than the diameter of the tube 58 but smaller than the diameter of end piece 68. In this manner, when the upper 46 and lower 48 portions of the slinger head are assembled, the end piece 68 will be received in its seat 74, and confined securely between the central bore 44 of the upper portion 46 of the slinger head 32 and the open support memeber 84 of the base 48.

The upper and lower portions of the slinger head 32 are configured to achieve a substantially airtight, interference fit, the bottom portion of the upper portion cylindrical wall 50 having a substantially flat ledge 98, defining an extension of the slinger head diameter. The base 48 has a diameter complementing that of the extended portion of the ledge 98 of the upper portion 46, and is defined by a floor 100 and a cylindrical side wall 102, the upper edge 104 of the side wall defining a seat for the ledge 98. A second, inner cylindrical wall 106 is provided proximate and parallel to said side wall 102. Preferably, the base 48 is an integrally formed member and the inner and outer walls 102, 106 may be joined by spaced structural supports 108. The inner wall 106 is slightly higher than said side wall 102 and extends up into the upper slinger head portion 46, closely adjacent the cylindrical wall 50 thereof. Support members 110 may be provided in the upper portion of the slinger head, adjacent the cylindrical wall, to abut the inner wall 106, resiliently retaining said wall securely in position within the upper portion 46 of the slinger head 32.

Excellent results are achieved where the ledge 98 of the upper portion 46 of the slinger head is approximately ⅜" in width.

It is imperative that the interference fit between the upper and lower portions of the slinger head 32 be secure and airtight and that the aperture 80 through which the tube 58 communicates with the atmosphere surround the enlarged mouthpiece 72 of the tube snugly to preserve the airtight fit between said upper 46 and lower 48 portions. Accordingly, the cut out portions 76, 78 in the upper portion 46 and base 48 of the slinger head extend through the ledge portion 98 of the upper portion 46 and through the inner wall 106 and side wall 102 of the base 48 and are formed with raised opposing edges 112, 114 configured to surround the mouthpiece 72 of the tube 58 tightly. The assembly of the slinger head 32 may be further reinforced by providing complementary shafts 116, 118 in the upper portion 46 and base 48 of the slinger head 32, respectively, said shafts being configured to nest together when the slinger head 32 is assembled and, preferably, provided with internal threading to receive such fastening members as screws.

The slinger head 32 may further be provided with counterweight members (not shown) to offset any imbalance caused by the tube 58.

As previously described, the cutting end of filament 30 is supported within the slinger head in filament support tube 58 which extends longitudinally from the central core 44 of the slinger head 32, through bend radius 66 and radially through the slinger head, to support the filament therewithin in its horizontal, cutting condition. Thus, when the filament type vegetation trimmer hereof is fully assembled, the filament conducting channel 28, the bore 42, extending through the power output shaft 24, the central bore 44 in the upper portion 46 of the slinger head 32, and the filament tube 58 are all in open communication and coact to provide a path through which the filament is directed down, longitudinally through the housing extension 16 of the; trimmer, through output shaft 24 the motor 22, and radially, out from the slinger head 32. In traversing this path, the filament 30 extends through bend radius 66 as hereinabove described. During operation, the radially extending portion of the filament 30 is whipped about by the slinger head 32, and thereby twists with respect to the stationary, longitudinal portion thereof. As a result, each revolution the filament 30 must untwist in order to maintain its proper axial condition, to prevent its twisting up. The filament untwists as a result of its resilience. However, the twisting and untwisting filament produces frictional heat, thereby raising the temperature of the filament and of the tube, particularly at the bend radius 66. Additionally, as the radial portion of the filament is swung about, it is subjected to a centrifugal force, generally of approximately 8 pounds, which results in the generation of additional heat in the filament 30 and in the tube 58, particularly at the bend radius 66 thereof.

If sufficient heat is generated in the tube, the filament line will tend to melt, lose its resilience and thereby will be unable to untwist. Should the condition arise wherein the filament is softened and unable to untwist, the filament will twist about itself as a result of the rotation and will become twisted up or will break off.

The heat generated in the filament tube 58 is directly proportional to the acuteness of the bend radius 66 through which the filament travels, as well as to such other factors as the diameter and speed of rotation of the filament, thus the heat within the tube can be controlled to some extent by providing a tube with a larger, less acute bend radius. However, a bend radius of larger dimension requires a longer tube and a larger slinger head, necessitating a more powerful motor, all of which add to the weight and cost of the unit.

The temperature rise caused by the heat generated in the filament tube can be reduced by providing a constant flow of cool air therethrough. However, this approach presents particular difficulties in filament trimmers of the type shown in the preferred embodiment wherein the filament feed passage extends through the power output shaft of an electric motor. Most trimmers of this type known in the art comprise closed filament storage and feed systems. It would be possible to achieve some airflow through a feed passage by providing an air inlet at the top thereof. However, to achieve substantial airflow at the bend radius between the longitudinally and radially extending portions of the filament tube, the area most susceptible to heating, it would be necessary to provide a significantly enlarged bore through an enlarged output shaft. This approach is unsatisfactory in that it would require a large, more powerful, motor with corresponding disadvantages in weight and cost of manufacture.

Therefore, and in accordance herewith, means are provided for proving significant airflow to the filament at the bend radius of the tube to slow its heating and softening and so to lengthen its useful life. Generally, the cooling means hereof channel a continuous flow of air through the filament support tube during operation. The air is supplied from the motor housing 14 through the aperture 56 in the fan 54.

The support tube 58 hereof is provided with a pair of apertures or ports 120, proximate the upper end thereof, through which the air enters the tube. Although it is possible to use a single port, two ports have been found to be preferable. By aligning the ports such that each is 90° from the inside radius of the tube 58, contact between the filament 30 and the potentially rough edges of the ports 120 will be avoided.

The ports provided should be sufficiently large to ensure proper air flow from the interior of the slinger head 32 through the filament tube 58. Accordingly, best results are achieved where the area encompassed by the sum of the area of the two inlet ports 120, is larger than the difference of the cross-sectional area of the tube 58 minus the cross-sectional area of the filament 30. In this manner, the relative cross sections of the tube 58 and the filament 30 will determine the most narrow portion of the air flow path and the degree of air flow will be limited only by those dimensions.

As previously mentioned, air is supplied to the tube through the aperture 56 in the fan 54. Air is drawn from the motor housing 14 through the aperture due to differences in air pressure between the interior of the motor housing at the fan and the interior 122 of the slinger head 32.

As is well known to those skilled in the art of air dynamics, the rapid rotation of the slinger head and fan results in a centrifugal force which tends to force air outward, creating a partial vacuum. Thus, a partial vacuum is created within the slinger head and at the fan outlet at the base of the motor housing. The vacuums at the fan in the motor housing 14 and within slinger head 32 are directly proportional to their respective radii. Therefore, if the slinger head, and the fan have substantially equal radii, the partial vacuums created at the fan in the motor housing 14 and in the slinger head 32 would be substantially equal and air would not be drawn from the motor housing 14 into the slinger head 32.

It is to be noted that the centrifugal force created by the fan in the motor housing forces air across the top of the fan rapidly, toward its perimeter. Accordingly, the air is caused to skim over the aperture 56 in the endwall 52, rather than to be drawn therethrough to the slinger head. This further impedes the desired air flow into the slinger head 32.

In order to provide for a significant flow of air through the filament support tube, the wall 57 is provided between the aperture 56 and the perimeter of the motor housing 14. This wall 57 interrupts the outward air flow and enables air to be drawn down into the slinger head 32.

As previously mentioned, the terminal end of the upper portion 46 and the base 48 of the slinger head 32 are larger in radius than the fan portion 54 of the slinger head, and the bottom of the motor housing 14.

In accordance herewith, the filament support tube 58 is dimensioned to extend to the side wall 102 of the base 48 and through the width of the ledge 98 of the upper portion 46 of the slinger head 32. The extended filament tube 58 is supported snugly and securely in the aperture 80 in the slinger head between the opposing edges 112, 114 of the side wall 102 of the base 48 and of the upper portion 46.

In this manner, the filament tube 58 is supported rigidly in its position and the air urged outwardly therethrough due to the vacuum therein created by the centrifugal force during rotation. This vacuum in the support tube 58 is translated to the interior of slinger head, with which it communicates, through ports 120. As the vacuum in the interior of the slinger head will be greater than that at the fan outlet in the motor housing 14, significant flow of air from the motor housing 14, through the aperture 56 into the slinger head 32 is achieved. This flow of air provides a steady source of air to cool the filament 30 within the tube 58. The vacuum created in the filament support tube 58 due to centrifugal force draws air from the slinger head 32 through the ports 120 and through the tube 58 to the atmosphere. This continuous flow of air through the filament support tube provides continuous cooling to the filament therewithin to slow heating due to friction and resultant softening.

The construction hereinbefore described extends the useful life of a cutting length of filament substantially and, therefore greatly increases the convenience and economy of the trimming device. Moreover, this increase in useful life is achieved without increasing the bend radius of the filament tube and the size and weight of the slinger head.

Still further, the present construction provides a substantially increased filament life while permitting a significant reduction in the bend radius of the filament tube. Resultingly, smaller and lighter slinger heads may be used in the present device, providing for more economical construction, and enhanced ease of use. Moreover, the lighter slinger head requires less power for rotation, thereby permitting the use of a smaller motor, thereby achieving corresponding economies and heightened convenience.

Thus, the present invention provides an improved slinger head in which means are provided to cool the rotating filament to prevent breakage and twisting thereof and to extend substantially its useful life. Many modifications of the present invention such as to conform the teachings hereof to filament trimmers of diverse configurations and mechanisms, will be evident to the skilled artisan, all falling within the scope and spirit of the appended claims.

What is claimed is:

1. A filament type vegetation trimmer comprising:
a wand;
a housing, associated with said wand;
a prime mover carried by said housing and having a rotary output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head;
a filament support tube positioned within said slinger head for redirecting said cutting end of filament from said longitudinal passage to rotate in a radial path in response to the rotation of the rotary output means; and
means provided in said filament support tube for cooling filament supported therein.

2. A filament type vegetation trimmer comprising:
a wand;
a housing, associated with said wand;
a prime mover carried by said housing and having a rotary power output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head;
a filament support tube positioned within said slinger head for redirecting said cutting end of filament from said longitudinal passage to rotate in a radial path in response to the rotation of the rotary output means; and
coacting means provided in said filament support tube and said slinger head for drawing air into said filament support tube to cool filament supported therein.

3. A filament type vegetation trimmer comprising:
a wand;
a housing, associated with said wand and having air inlet means for admitting a supply of air thereinto;
a prime mover carried by said housing and having a rotary power output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head;
a filament support tube positioned within said slinger head for redirecting said cutting end of filament from said longitudinal passage to rotate in a radial path in response to the rotation of the rotary output means; and
coacting means provided in said filament support tube and said slinger head for drawing said supply of air into and through said filament support tube to cool filament supported therein.

4. A filament type vegetation trimmer comprising:
a wand;
a housing, associated with said wand and having air inlet means for admitting a supply of air thereinto;
a prime mover carried by said housing and having rotary power output means associated therewith;
a slinger head drivingly coupled with said rotary power output means;

means for storing a supply of filament, said storage means being longitudinally spaced from said slinger head;

means for guiding a cutting end of said filament through a longitudinal passage to said slinger head;

a filament support tube positioned within said slinger head for redirecting said cutting end of filament from said longitudinal passage to rotate in a radial path in response to the rotation of the rotary output means and having at least one air inlet port therein; and wherein said filament support tube and said slinger head are configured to draw said supply of air through said filament support tube during trimmer operation to cool filament supported therein.

5. A filament type vegetation trimmer comprising:
a wand;
a housing, associated with said wand and having air inlet means for admitting a supply of air thereinto;
a prime mover carried by said housing and having a rotary power output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head;
a filament support tube positioned within said slinger head for redirecting said cutting end of filament from said longitudinal passage to rotate in a radial path in response to the rotation of the rotary output means, and having at least one air inlet port therein;
wherein said slinger head comprises an endwall and fan means and is adapted to be mounted on and to enclose said housing with said fan means opposing said prime mover for cooling thereof during operation and said endwall having an aperture therethrough for admitting air into said slinger head for passage through said filament support tube to cool filament supported therein.

6. A filament type vegetation trimmer comprising:
a wand;
a housing, associated with said wand and having air inlet means for admitting a supply of air thereinto;
a prime mover carried by said housing and having a rotary power output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head;
a filament support tube positioned within said slinger head for redirecting said cutting end of filament from said longitudinal passage to rotate in a radial path in response to the rotation of the rotary output means, and having at least one air inlet port therein;
wherein said slinger head comprises an endwall and fan means and is adapted to be mounted on and to enclose said housing with said fan means opposing said prime mover for cooling thereof during operation and said endwall having an aperture therethrough for admitting air into said slinger head and wherein said filament support tube extends radially beyond the area defined by said fan to provide an air pressure differential at said tube and said fan effective to draw said supply of air through said filament support tube to cool filament supported therein.

7. A filament type vegetation trimmer comprising:
a wand;
a housing, associated with said wand and having air inlet means for admitting a supply of air thereinto;
a prime mover carried by said housing and having a rotary power output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head;
a filament support tube positioned within said slinger head for redirecting said cutting end of filament from said longitudinal passage to rotate in a radial path in response to the rotation of the rotary output means, and having at least one air inlet port therein;
wherein said slinger head comprises an endwall and fan means and is adapted to be mounted on and to enclose said housing with said fan means opposing said prime mover for cooling thereof during operation and said endwall having an aperture therethrough for admitting air into said slinger head and wherein said filament support tube extends radially beyond the area defined by said fan and endwall to provide an air pressure differential at said tube and said fan effective to draw said supply of air through said filament support tube to cool filament supported therein.

8. A filament type vegetation trimmer comprising:
a wand;
a housing, associated with said wand;
a prime mover carried by said housing and having a rotary power output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head;
a filament support tube positioned within said slinger head for redirecting said cutting end of filament from said longitudinal passage to rotate in a radial path in response to the rotation of the rotary output means and comprising a substantially longitudinal portion, a substantially radial portion and a bend radius therebetween; and
means for drawing a flow of air through said filament support tube from said longitudinal portion thereof through said radial portion thereof to cool filament supported therein.

9. A filament type vegetation trimmer comprising:
a wand;
a housing, associated with said wand and having air inlet means for admitting a supply of air thereinto;
a prime mover carried by said housing and having a rotary power output means associated therewith;
a slinger head drivingly coupled with said rotary power output means;
means for storing a supply of filament, said storage means being longitudinally spaced from said slinger head;

means for guiding a cutting end of said filament through a longitudinal passage to said slinger head;

a filament support tube positioned within said slinger head for redirecting said cutting end of filament from said longitudinal passage to rotate in a radial path in response to the rotation of the rotary output means and comprising a substantially longitudinal portion, a substantially radial portion and a bend radius therebetween; and means for drawing said supply of air through said filament support tube from said longitudinal portion thereof through said radial portion thereof to cool filament supported therein.

10. A filament type vegetation trimmer comprising:
a wand;
a housing, associated with said wand and having air inlet means for admitting a supply of air thereinto;
a prime mover carried by said housing and having a rotary output means;
means for storing a supply of filament, said storage means being longitudinally spaced from said slinger head;
means for guiding a cutting end of said filament through a longitudinal passage to said slinger head; and
a filament support tube positioned within said slinger head for redirecting said cutting end of filament from said longitudinal passage to rotate in a radial path in response to the rotation of the rotary output means, said filament support tube comprising a substantially longitudinal portion, a substantially radial portion and a bend radius therebetween and having at least one air inlet port in said longitudinal portion thereof;
wherein said filament support tube and said slinger head are configured to draw said supply of air into said tube inlet port and through said filament support tube during trimmer operation.

11. A filament type vegetation trimmer comprising:
a wand;
a housing, associated with said wand and having air inlet means for admitting a supply of air thereinto;
a prime mover carried by said housing and having a rotary power output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head; and
a filament support tube positioned within said slinger head for redirecting said cutting end of filament from said longitudinal passage to rotate in a radial path in response to the rotation of the rotary output means, said filament support tube comprising a substantially longitudinal portion, a substantially radial portion and a bend radius therebetween and having at least one air inlet port in said longitudinal portion thereof;
wherein said slinger head comprises an endwall and fan means and is adapted to be mounted and to enclose said housing with said fan means opposing said prime mover for cooling during operation and said endwall having an aperture therethrough for admitting air into said slinger head for passage through said filament support tube to cool filament supported therein.

12. A filament type vegetation trimmer comprising:
a wand;
a housing, associated with said wand and having air inlet means for admitting a supply of air thereinto;
a prime mover carried by said housing and having a rotary power output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head; and
a filament support tube positioned within said slinger head for redirecting said cutting end of filament from said longitudinal passage to rotate in a radial path in response to the rotation of the rotary output means, said filament support tube comprising a substantially longitudinal portion, a substantially radial portion and a bend radius therebetween and having at least one air inlet port in said longitudinal portion thereof;
wherein said slinger head comprises an endwall and fan means and is adapted to be mounted on said housing with said fan means opposing said prime mover for cooling during operation and said endwall having an aperture therethrough for admitting air into said slinger head, and wherein said filament support tube extends radially beyond the area defined by said fan to provide an air pressure differential at said tube and said fan effective to draw air into said slinger head and through said filament support tube to cool filament supported therein.

13. A filament type vegetation trimmer comprising:
a wand;
a housing, associated with said wand and having air inlet means for admitting a supply of air thereinto;
a prime mover carried by said housing and having a rotary power output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head; and
a filament support tube positioned within said slinger head for redirecting said cutting end of filament from said longitudinal passage to rotate in a radial path in response to the rotation of the rotary output means, said filament support tube comprising a substantially longitudinal portion, a substantially radial portion and a bend radius therebetween and having at least one air inlet port in said longitudinal portion thereof;
wherein said slinger head comprises an endwall and fan means and is adapted to be mounted on said housing with said fan means opposing said prime mover for cooling thereof during operation and said endwall having an aperture therethrough for admitting air into said slinger head, and wherein said filament support tube extends radially beyond the area defined by said fan to provide an air pressure differential at said tube and said fan effective to draw said supply of air into said slinger head and through said filament support tube to cool filament supported therein.

14. A filament type vegetation trimmer comprising:
a wand;
a housing, associated with said wand and having air inlet means for admitting a supply of air thereinto;
a prime mover carried by said housing and having a rotary power output means associated therewith;
a slinger head drivingly coupled with said rotary power output means;
means for storing a supply of filament, said storage means being longitudinally spaced from said slinger head;
means for guiding a cutting end of said filament through a longitudinal passage to said slinger head; and
a filament support tube positioned within said slinger head for redirecting said cutting end of filament from said longitudinal passage to rotate in a radial path in response to the rotation of the rotary output means, said filament support tube comprising a substantially longitudinal portion, a substantially radial portion and a bend radius therebetween and having at least one air inlet port in said longitudinal portion thereof;
wherein said slinger head comprises an endwall and fan means and is adapted to be mounted on said housing with said fan means opposing said prime mover for cooling thereof during operation and said endwall having an aperture therethrough for admitting air into said slinger head, and wherein said filament support tube extends radially beyond the area defined by said endwall and fan to provide an air pressure differential at said tube and said fan effective to draw said supply of air into said slinger head and through said filament support tube to cool filament supported therein.

15. A filament type vegetation trimmer comprising:
a wand;
a handle, mounted on a first end of said wand;
a housing, carried on a second end of said wand;
a prime mover mounted in said housing and having a rotary power output means;
a slinger head drivingly coupled with said rotary power output means;
means for storing a supply of filament intermediate said prime mover and said handle;
means for guiding a cutting end of said filament through a longitudinal passage to said slinger head;
a filament support tube positioned within said slinger head for supporting said cutting end of filament to rotate in a radial path in response to the rotation of the rotary output means; and
means provided in said filament support tube for cooling filament supported therein.

16. A filament type vegetation trimmer comprising:
a wand;
a handle, mounted on a first end of said wand;
a housing, carried on a second end of said wand;
a prime mover mounted in said housing and having a rotary power output means;
a slinger head drivingly coupled with said rotary power output means;
means for storing a supply of filament intermediate said prime mover and said handle;
means for guiding a cutting end of said filament through a longitudinal passage to said slinger head;
a filament support tube positioned within said slinger head for supporting said cutting end of filament to rotate in a radial path in response to the rotation of the rotary output means; and
coacting means provided in said filament support tube and said slinger head for drawing air into said filament support tube to cool filament supported therein.

17. A filament type vegetation trimmer comprising:
a wand;
a handle, mounted on a first end of said wand;
a housing, carried on a second end of said wand and having air inlet means for admitting a supply of air thereinto;
a prime mover mounted in said housing and having a rotary power output means;
a slinger head drivingly coupled with said rotary power output means;
means for storing a supply of filament intermediate said prime mover and said handle;
means for guiding a cutting end of said filament through a longitudinal passage to said slinger head;
a filament support tube positioned within said slinger head for supporting said cutting end of filament to rotate in a radial path in response to the rotation of the rotary output means and having at leadt one air inlet port therein; and
wherein said filament support tube and said slinger head are configured to draw said supply of air into said slinger head and through said filament support tube during trimmer operation to filament supported therein.

18. A filament type vegetation trimmer comprising:
a wand;
a handle, mounted on a first end of said wand;
a housing, carried on a second end of said wand and having air inlet means for admitting a supply of air thereinto;
a prime mover mounted in said housing and having a rotary power output means;
a slinger head drivingly coupled with said rotary power output means;
means for storing a supply of filament intermediate said prime mover and said handle;
means for guiding a cutting end of said filament through a longitudinal passage to said slinger head;
a filament support tube positioned within said slinger head for supporting said cutting end of filament to rotate in a radial path in response to the rotation of the rotary power output means, and having at least one air inlet port therein; and
wherein said slinger head comprises an endwall and fan means and is adapted to be mounted on and to enclose said housing with said fan means opposing said prime mover for cooling thereof during operation and said endwall having an aperture therethrough for admitting air into said slinger head for passage through said filament support tube to cool filament supported therein.

19. A filament type vegetation trimmer comprising:
a wand;
a handle, mounted on a first end of said wand;
a housing, carried on a second end of said wand;
a prime mover mounted in said housing and having a rotary power output means;
a slinger head drivingly coupled with said rotary power output means;

means for storing a supply of filament intermediate said prime mover and said handle;

means for guiding a cutting end of said filament through a longitudinal passage to said slinger head;

a filament support tube positioned within said slinger head for supporting said cutting end of filament to rotate in a radial path in response to the rotation of the rotary output means, and having at least one air inlet port therein; and wherein said slinger head is adapted to be mounted on said housing, and wherein said filament support tube and said slinger head are configured to provide an air pressure differential at said tube and said fan during trimmer operation effective to draw said supply of air into said slinger head and into and through said filament support tube.

20. A filament type vegetation trimmer comprising:
a wand;
a handle, mounted on a first end of said wand;
a housing, carried on a second end of said wand;
a prime mover mounted in said housing and having a rotary power output means;
a slinger head drivingly coupled with said rotary power output means;
means for storing a supply of filament intermediate said prime mover and said handle;
means for guiding a cutting end of said filament through a longitudinal passage to said slinger head;
a filament support tube positioned within said slinger head for supporting said cutting end of filament to rotate in a radial path in response to the rotation of the rotary output means, and having at least one air inlet port therein; and
wherein said slinger head comprises an endwall and fan means and is adapted to be mounted on and to enclose said housing with said fan means opposing said prime mover for cooling thereof during operation and said endwall having an aperture therethrough for admitting air into said slinger head, and wherein said filament support tube extends radially beyond the area defined by said fan to provide an air pressure differential at said tube and said fan during trimmer operation, effective to draw air through said filament support tube to cool filament supported therein.

21. A filament type vegetation trimmer comprising:
a wand;
a handle, mounted on a first end of said wand;
a housing, carried on a second end of said wand;
a prime mover mounted in said housing and having a rotary power output means;
a slinger head drivingly coupled with said rotary power output means;
means for storing a supply of filament intermediate said prime mover and said handle;
means for guiding a cutting end of said filament through a longitudinal passage to said slinger head;
a filament support tube positioned within said slinger head for supporting said cutting end of filament to rotate in a radial path in response to the rotation of the rotary output means, and having at least one air inlet port therein; and
wherein said slinger head comprises an endwall and fan means and is adapted to be mounted on and to enclose said housing with said fan means opposing said prime mover for cooling thereof during operation and said endwall having an aperture therethrough for admitting air into said slinge head, and wherein said filament support tube extends radially beyond the area defined by said fan and endwall to provide an air pressure differential at said tube and said fan effective to draw air through said filament support tube to cool filament supported therein.

22. A filament type vegetation trimmer comprising:
a wand;
a handle, mounted on a first end of said wand;
a housing, carried on a second end of said wand;
a motor mounted in said housing and having a rotary power output shaft provided with a longitudinally extending bore therethrough;
a slinger head drivingly coupled with said rotary power output shaft;
means for storing a supply of filament intermediate said motor and said handle;
means for guiding a cutting end of said filament through a longitudinal feed passage through said rotary output shaft bore to said slinger head;
a filament support tube mounted within said slinger head and in open communication with said rotary output shaft bore for supporting said cutting end of filament to rotate radially with said sling head; and
means provided in said filament support tube for cooling filament supported therein.

23. A filament type vegetation trimmer comprising:
a wand;
a handle, mounted on a first end of said wand;
a housing, carried on a second end of said wand;
a motor mounted in said housing and having a rotary power output shaft provided with a longitudinally extending bore therethrough;
a slinger head drivingly coupled with said rotary power output shaft;
means for storing a supply of filament intermediate said motor and said handle;
means for guiding a cutting end of said filament through a longitudinal feed passage through said rotary output shaft bore to said slinger head;
a filament support tube mounted within said slinger head and in open communication with said rotary output shaft bore for supporting said cutting end of filament to rotate radially with said slinger head; and
coacting means provided in said filament support tube and said slinger head for drawing air into said filament support tube for cooling filament therein.

24. A filament type vegetation trimmer comprising:
a wand;
a handle, mounted on a first end of said wand;
a housing, carried on a second end of said wand and having air inlet means for admitting a supply of air thereinto;
a motor mounted in said housing and having a rotary power output shaft provided with a longitudinally extending bore therethrough;
a slinger head drivingly coupled with said rotary power output shaft;
means for storing a supply of filament intermediate said motor and said handle;
means for guiding a cutting end of said filament through a longitudinal feed passage through said rotary output shaft bore to said slinger head;
a filament support tube mounted within said slinger head and in open communication with said rotary output shaft bore for supporting said cutting end of filament to rotate radially with said slinger head; and coacting means provided in said filament support tube and said slinger head for channeling said supply of air into and through said filament support tube to cool filament supported therein.

25. A filament type vegetation trimmer comprising:
a wand;
a handle, mounted on a first end of said wand;
a housing, carried on a second end of said wand and having air inlet means for admitting a supply of air thereinto;
a motor mounted in said housing and having a rotary power output shaft provided with a longitudinally extending bore therethrough;
a slinger head drivingly mounted on said rotary power output means;
means for storing a supply of filament intermediate said motor and said handle;
means for guiding a cutting end of said filament through a longitudinal feed passage through said rotary output shaft bore to said slinger head; and
a filament support tube mounted within said slinger head in open communication with said rotary output shaft bore for supporting said cutting end of filament to rotate radially with said slinger head, said filament support tube comprising a substantially longitudinal portion, a substantially radial portion, and a bend radius interposed therebetween and being provided with at least one air inlet port in said longitudinal portion to provide means for channeling air therethrough;
wherein said filament support tube and said slinger head are provided with means for drawing said supply of air into said slinger head and through said filament support tube to cool filament supported therein.

26. A filament type vegetation trimmer comprising:
a wand;
a housing, carried on a second end of said wand and having air inlet means for admitting a supply of air thereinto;
a motor mounted in said housing and having a rotary power output shaft provided with a longitudinally extending bore therethrough;
a slinger head drivingly coupled with said rotary power output means and comprising an endwall and fan, said endwall and fan opposing said prime mover for cooling thereof during trimmer operation and configured to enclose said housing, and said endwall having an aperture therethrough for admitting air from said housing to said slinger head;
means for storing a supply of filament intermediate said motor and said handle;
means for guiding a cutting end of sai filament through a longitudinal feed passage through said rotary output shaft bore to said slinger head; and
a filament support tube mounted within said slinger head in open communication with said power output shaft bore for supporting said cutting end of filament to rotate radially with said slinger head, said filament support tube comprising a substantially longitudinal portion, a substantially radial portion and a bend radius interposed therebetween, and having at least one air inlet port in said longitudinal portion, and
wherein said filament support tube and said fan are dimensioned to create an air pressure differential therebetween during trimmer operation, said air pressure differential drawing air admitted into said housing into said slinger head and through said filament support tube.

27. A filament type vegetation trimmer comprising:
a wand;
a handle, mounted on a first end of said wand;
a housing, carried on a second end of said wand and having air inlet means for admitting a supply of air thereinto;
a motor mounted in said housing and having a rotary power output shaft provided with a longitudinally extending bore therethrough;
a slinger head drivingly coupled with said rotary power output means and comprising an endwall and fan, said endwall and fan opposing said prime mover for cooling thereof during trimmer operation and configured to enclose said housing, and said endwall having an aperture therethrough for admitting air from said housing to said slinger head;
means for storing a supply of filament intermediate said motor and said handle;
means for guiding a cutting end of said filament through a longitudinal feed passage through said rotary output shaft bore to said slinger head; and
a filament support tube mounted within said slinger head in open communication with said power output shaft bore for supporting said cutting end of filament to rotate radially with said slinger head, said filament support tube comprising a substantially longitudinal portion, a substantially radial portion and a bend radius interposed therebetween, and having at least one air inlet port in said longitudinal portion, and
wherein said filament support tube is dimensioned to extend radially beyond the area defined by said fan to create an air pressure differential therebetween during trimmer operation, said air pressure differential drawing air admitted into said housing into said slinger head and through said filament support tube.

28. A filament type vegetation trimmer comprising:
a wand;
a handle, mounted on a first end of said wand;
a housing, carried on a second end of said wand and having air inlet means for admitting a supply of air thereinto;
a motor mounted in said housing and having a rotary power output shaft provided with a longitudinally extending bore therethrough;
a slinger head drivingly coupled with said rotary power output means and comprising an endwall and fan, said endwall and fan opposing said prime mover for cooling thereof during trimmer operation and configured to enclose said housing, and said endwall having an aperture therethrough for admitting air from said housing to said slinger head;
means for storing a supply of filament intermediate said motor and said handle;
means for guiding a cutting end of said filament through a longitudinal feed passage through said rotary output shaft bore to said slinger head; and
a filament support tube mounted within said slinger head in open communication with said power output shaft bore for supporting said cutting end of filament to rotate radially with said slinger head, said filament support tube comprising a substantially longitudinal portion, a substantially radial portion and a bend radius interposed therebetween, and having at least one air inlet port in said longitudinal portion, and wherein said filament support tube is dimensioned to extend radially beyond the area defined by said endwall and fan to create an air pressure differential therebetween during trimmer operation, said air pressure differential drawing air admitted into said housing into said slinger head and through said filament support tube.

29. In a filament type trimmer of the type using a rotating segment of thin flexible filament to cut grass and other vegetation and including a stationary supply of filament, rotary drive means, a passageway along the axis of said drive means to conduct a free end of said filament supply therethrough to form said cutting segment and tubular means, including a curved portion, for redirecting said filament from said axis into a cutting plane radial to said axis, the improvement comprising means for introducing a flow of cooling air into said tubular means between said drive means and said curved portion of said tubular means whereby softening of said filament is prevented.

* * * * *